(12) United States Patent
Mahadevan et al.

(10) Patent No.: US 10,749,741 B1
(45) Date of Patent: Aug. 18, 2020

(54) METHODS AND SYSTEMS FOR AUTO-DISCOVERY OF VXLAN VTEPS USING PIM BSR

(71) Applicant: DELL PRODUCTS L.P., Round Rock, TX (US)

(72) Inventors: Ramasubramani Mahadevan, Chennai (IN); Avinash Natarajan, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/394,658

(22) Filed: Apr. 25, 2019

(51) Int. Cl.
*H04L 12/24* (2006.01)
*H04L 12/46* (2006.01)

(52) U.S. Cl.
CPC ...... *H04L 41/0803* (2013.01); *H04L 12/4633* (2013.01); *H04L 12/4675* (2013.01); *H04L 41/12* (2013.01)

(58) Field of Classification Search
CPC ............. H04L 12/4633; H04L 12/4675; H04L 12/185; H04L 12/1881; H04L 12/18; H04L 12/4641; H04L 41/0803; H04L 41/12; H04L 41/0806; H04L 43/12; H04L 61/2007; H04L 63/0876; G06F 9/45533; G06F 9/45558
See application file for complete search history.

(56) References Cited

U.S. PATENT DOCUMENTS

| 2016/0085569 A1* | 3/2016 | Venkataswami .... G06F 9/45533 718/1 |
| 2016/0226818 A1* | 8/2016 | Kamath .............. G06F 9/45558 |
| 2017/0317919 A1* | 11/2017 | Fernando ............ H04L 41/0806 |
| 2018/0191870 A1* | 7/2018 | Ramesh .............. H04L 12/1881 |
| 2018/0227135 A1* | 8/2018 | Drake .................... H04L 12/18 |
| 2019/0036736 A1* | 1/2019 | Gao .................... H04L 63/0876 |
| 2019/0109783 A1* | 4/2019 | Kommula .............. H04L 43/12 |
| 2019/0158381 A1* | 5/2019 | Beeram .............. H04L 12/4641 |

(Continued)

OTHER PUBLICATIONS

A Dell EMC VXLAN Technical White Paper, "A standard based Data Center Interconnection solution," VXLAN Technical Brief, Dell EMC Networking.

(Continued)

*Primary Examiner* — Le H Luu
(74) *Attorney, Agent, or Firm* — North Weber & Baugh LLP

(57) ABSTRACT

Described herein are systems and methods that provide for auto-discovery of VXLAN tunnel endpoints (VTEPs) using a protocol-independent multicast (PIM) bootstrap router (BSR). In one or more embodiments, a node may be configured via PIM messaging in which nodes of a network provide their candidate-rendezvous point (RP) advertisements send their information of candidate-RP to multicast group information to an elected BSR. The elected BSR consolidates the candidate-RP to multicast group information and propagates this information to nodes through PIM messages to all PIM routers in the network. In one or more embodiments, a node uses this information in combination with its local configuration mapping of VNIDs-to-multicast-group information to generate a remote VTEP-IP-(RP)-to-VNID mapping, which can be used to auto configure the node's VXLAN with remote-VTEP and VNI profiles in static VXLAN deployments.

20 Claims, 9 Drawing Sheets

(56) References Cited

U.S. PATENT DOCUMENTS

2019/0190734 A1* 6/2019 Shen .................... H04L 12/1854
2019/0207779 A1* 7/2019 Immidi ............... H04L 12/4641
2019/0245773 A9* 8/2019 Basha ................. H04L 61/2007
2020/0036646 A1* 1/2020 Mathew .............. H04L 12/4641

OTHER PUBLICATIONS

Data Center Technical Marketing, Feb. 2017. (22pgs).

* cited by examiner

METHODS AND SYSTEMS FOR AUTO-DISCOVERY OF VXLAN VTEPS USING PIM BSR

BACKGROUND

The present disclosure relates generally to Virtual Extensible LANs (VXLAN). More particularly, the present disclosure relates to methods and systems for auto-discovery of VXLAN tunnel endpoints (VTEPs) using a protocol-independent multicast (PIM) bootstrap router (BSR).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network segmentation may be provided through VLANs (Virtual Local Area Networks). A VLAN may be any broadcast domain that is partitioned and isolated in a computer network at the data link layer (OSI Layer 2). Essentially, VLANs are a set of hosts or a single host that are assigned to a different VLAN ID in order to segment traffic from each other. If these hosts desired to communicate with each other, inter-VLAN routing may be used. VLANS have inherent limitations including inefficient network inter-links with only Layer 2 operation, spanning tree limitations, physical location of devices, limited number of VLANs, multi-tenant environments, and ToR (Top of Rack) switch scalability. To address many of these issues, a virtual extensible LAN (VXLAN) was introduced to support virtualization of networks and resources. VXLAN provides a Layer 2 overlay mechanism on an existing Layer 3 network by encapsulating the Layer 2 frames in Layer 3 packets. More specifically, VXLAN uses a VLAN-like encapsulation technique to encapsulate OSI Layer 2 Ethernet frames within Layer 4 UDP datagrams, using 4789 as the default IANA-assigned destination UDP port number. (IANA is the Internet Assigned Numbers Authority) VXLAN endpoints, which terminate VXLAN tunnels, may be either virtual or physical switch ports, are known as VXLAN tunnel endpoints (VTEPs).

When it comes to VTEP discoveries, there are two approaches: Dynamic and Static. Static VXLAN deployments may have a limitation, i.e., a pain point, of requiring a manual configuration of the remote VTEPs and their associated VXLAN VNID (virtual network ID) segments in the network. Without this manual configuration, VTEP may not learn the presence of host VMs or may not create the flood-list to send broadcast, unknown-unicast and multicast traffic (BUM traffic) to all the hosts in a virtual machine (VM) segment.

Accordingly, it is desirable to provide a mechanism by which all VTEPs and their associated virtual networks (VNs) are auto-discovered in static VXLAN deployments.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

Figure 1:
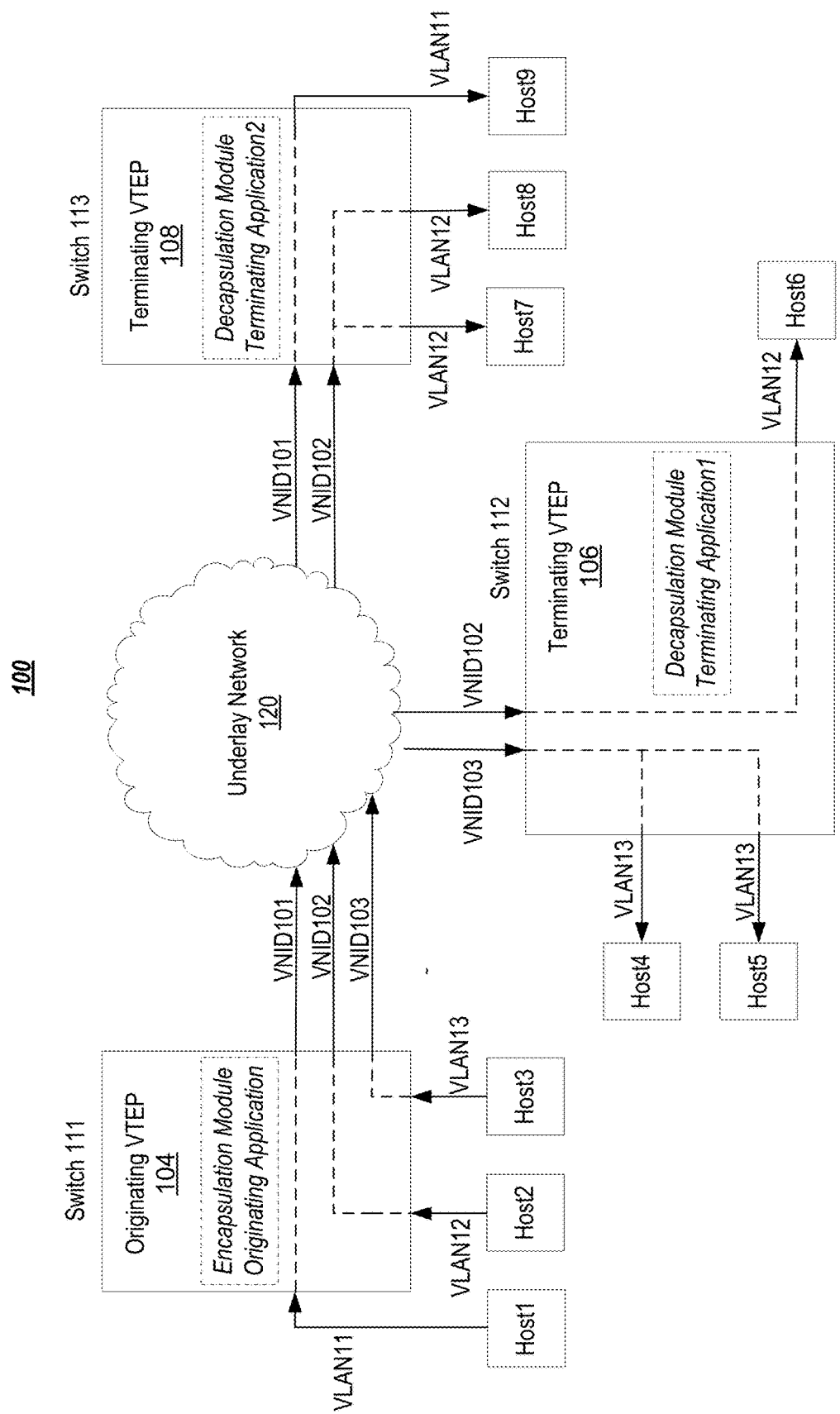
FIG. 1 depicts a VXLAN network, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. All documents cited herein are incorporated by reference herein in their entirety. It shall also be noted that although embodiments described herein may be within the context of virtualization of networks and resources, aspects of the present disclosure are not so limited. Accordingly, the aspects of the present disclosure may be applied or adapted for use in other contexts.

A. VLANs

In one or more embodiments, a Virtual Local Area Network (VLAN) may be any broadcast domain that is partitioned and isolated in a computer network at the data link layer (OSI Layer 2). VLANs may be implemented based on IEEE 802.1Q. VLANs allow network administrators to group hosts together even if the hosts are not directly connected to the same network switch. Essentially, VLANs are a set of hosts or a single host that are assigned to a different VLAN ID in order to segment them from each other. If these hosts desire to communicate with each other, inter-VLAN routing may be employed. As previously discussed, VLANS have inherent limitations including inefficient network inter-links with Layer 2 operation, spanning tree limitations, physical location of devices, limited number of VLANs, multi-tenant environments, and ToR (Top of Rack) switch scalability.

B. VXLANs

In one or more embodiments, Virtual Extensible LAN (VXLAN) is a network virtualization technology that attempts to address the scalability problems associated with large cloud computing deployments. VXLAN is intended to address the inherent limitations of VLANs. VXLAN represents an evolution of efforts to standardize on an overlay encapsulation protocol. In some embodiments, it may increase scalability from 4094 to over 16 million logical networks and allows for Layer 2 communication across IP networks. Multicast or unicast with head-end replication (HER) is used to flood broadcast, unknown unicast, and multicast traffic.

In one or more embodiments, VXLAN may provide a Layer 2 overlay mechanism on an existing Layer 3 network in a virtualized data center. A virtualized data center may comprise virtual machines (VMs) in a multi-tenant environment. The VXLAN shared forwarding domain allows hosts (virtual and physical machines) in tenant Layer 2 segments to communicate over the shared IP network. In some embodiments, each tenant Layer 2 segment may be identified by a VXLAN network identifier (VNID).

In one or more embodiments, VXLAN uses a VLAN-like encapsulation technique to encapsulate OSI Layer 2 Ethernet frames within Layer 4 UDP datagrams, using, e.g. 4789, as the default IANA-assigned destination UDP port number for transport across the IP underlay network. VXLAN endpoints are known as VXLAN tunnel endpoints (VTEPs). Key elements used within a VXLAN may include: VXLAN network identifier (VNID), VTEP (VXLAN Tunnel End Point), Multicast support—IGMP and PIM, and Layer 3 routing protocol—OSPF, BGP, IS-IS, QoS.

C. VXLAN Elements

1. VXLAN Network Identifier (VNID)

In one or more embodiments, a virtual network identifier is indicates as "VNI". A configuration of a virtual network may be referred to as a "VNI profile".

In a VXLAN network, a VXLAN virtual network identifier may be indicated as VNID". A VNID is an ID number that identifies a tenant segment and may be transmitted in a VXLAN encapsulated packet. The VXLAN header together with the original Ethernet frame may be in the UDP payload. The VNID is used to identify Layer 2 segments and to maintain Layer 2 isolation between the segments. Each VXLAN segment, or VNID, may be mapped to an IP multicast group in the transport IP network. In one or more embodiments, VNID may be part of the outer header that encapsulates the inner MAC frame sourced by the VM.

2. VTEP (VXLAN Tunnel End Point)

In one or more embodiments, VXLAN is an "encapsulation" scheme and may be also referred as a "tunneling" scheme. VXLAN may implement a VTEP in software or hardware. A switch with connected end hosts may be assigned to virtual networks, and the virtual networks are mapped to VXLAN segments. Local and remote VTEP performs encapsulation and de-capsulation of VXLAN headers for the traffic between end hosts. Tunneling implementations may have a starting and end point (or logical interface) to the tunnel. That is, a VTEP has two logical interfaces: an uplink and downlink. The uplink interface receives VXLAN frames and acts as the tunnel endpoint with an IP address used for routing VXLAN encapsulated frames. The IP address assigned to this uplink interface is part of the network infrastructure and separate from the VMs or tenants IP addressing using the VXLAN fabric.

In one or more embodiments, packets received on the uplink interface are mapped from the VXLAN VNID segment to a VLAN and the Ethernet payload, and then sent as an 802.1Q Ethernet frame on the downlink to the final destination. As this packet passes through the VTEP, a local table is created with the inner MAC SOURCE ADDRESS and VXLAN ID. Packets that arrive at the downlink interface are used to create a VXLAN ID to regular VLAN map. The VTEP may use information from the outer IP header to route or switch traffic from the VMs or physical host. An example VXLAN frame is further discussed relative to FIG. 2.

3. Multicast and Protocol-Independent Multicast (PIM)

In one or more embodiments, multicast may be required whenever a VM or host attempts to communicate with another VM or host over Layer 3 (IP) or Layer 2. Typically, if the destination VM or host is in the same subnet, the source VM or host will send out an ARP broadcast packet. In a non-VXLAN environment, this frame may be broadcast across all devices carrying that VLAN. In a VXLAN environment, a broadcast ARP packet may be sent to a multicast group address. A VXLAN VNID may be mapped to this multicast address group. The VxLAN VNID mapping to multicast group address is typically provisioned by a user in all the VTEPs in a consistent manner.

In one or more embodiments, protocol-independent multicast (PIM) protocols may be used to deliver multicast packets from one source to multiple receivers. They can facilitate better bandwidth utilization, and use less host and router processing, making them ideal for usage in applications such as video and audio conferencing, whiteboard tools, stock distribution tickers, etc. PIM is a widely used multicast routing protocol. PIM is a standard multicast routing protocol that provides scalable inter-domain multicast routing across the Internet, independent of the mechanisms provided by any particular unicast routing protocol. The term "protocol independent" means that PIM can function by making use of routing information supplied by a variety of communications protocols.

In one or more embodiments, there are two types of PIM protocols. A PIM is the sparse mode may be used for transmission of data to nodes in multiple Internet domains where it is expected that only a small proportion of the potential nodes will actually subscribe. Dense mode, in contrast to sparse mode, may be used when it is expected that a large proportion of the potential nodes will subscribe to the multicast. In source-specific multicast, paths (also called trees) originate (or are rooted) at a single, defined source, whereas bidirectional PIM is not source-specific.

4. Rendezvous Point (RP) and Bootstrap Router (BSR)

In one or more embodiments, a Rendezvous Point (RP) is a router in a multicast network domain that acts as a shared root for a multicast shared tree. Any number of routers can be configured to work as RPs and they may be configured to cover different group ranges. For correct operation, every multicast router within a Protocol-Independent Multicast (PIM) domain must be able to map a particular multicast group address to the same RP.

In one or more embodiments, a Bootstrap Router (BSR) is a mechanism for a router to learn RP information. It ensures that all routers in the PIM domain have the same RP cache as the BSR. It is possible to configure the BSR to help select an RP set from BSR candidate RPs. The function of the BSR is to broadcast the consolidated candidate-RP-set-to-multicast-group mapping to all routers in the domain. With the BSR mechanism, a BSR may be elected to be a primary BSR. A primary BSR may also be referred to as an elected BSR.

The primary BSR sends BSR messages with RP set information to all enabled interfaces. The candidate-RPs can send their candidate-RP advertisements directly to the primary BSR. The primary BSR receives candidate-RP messages from all candidate-RPs in the domain. The bootstrap message sent by the BSR includes information about all the candidate-RPs. Each router may use a common or the same algorithm, e.g. hash algorithm, to select the same RP address for a given multicast group.

In other words, to determine which router is the rendezvous point (RP), all routers within a PIM sparse-mode domain may collect bootstrap messages. A PIM sparse-mode domain is a group of routers that all share the same RP router for a single multicast group. The same router may be an RP for all the multicast groups as well. The domain bootstrap router initiates bootstrap messages, which are sent hop by hop within the domain. The routers use bootstrap messages to distribute RP information dynamically. In some embodiments, a BSR message may be referred to as a PIM message since a BSR message utilizes the PIM protocol.

In one or more embodiments, broadcast, unknown-unicast and multicast traffic (BUM traffic) is network traffic that may be transmitted by sending data link network traffic to a destination where the sender may not know the network address. This may be achieved by sending the network traffic to multiple destinations on a network.

D. VXLAN Network

FIG. 1 depicts VXLAN network 100, according to embodiments of the present disclosure. VXLAN network 100 comprises three switches, Switch 111, Switch 112 and Switch 113 that are coupled via Underlay Network 120. It shall be noted that the information handling systems 111, 112 and 113 are labeled as "Switch" but they may be routers or a device that performs both switching and routing functions. Host1, Host2 and Host3 are respectively coupled to VLAN segments, VLAN11, VLAN12 and VLAN13 to Switch 111. Switch 111 comprises an Originating VTEP 104 that includes an encapsulation module. VLAN segments, VLAN11, VLAN12 and VLAN13, are encapsulated by Originating VTEP 104 resulting in the generation of VXLAN segments VNID101, VNID102 and VNID103. VXLAN segments VNID 101, VNID102 and VNID103 correspond to VLAN segments, VLAN11, VLAN12 and VLAN13, respectfully.

In one or more embodiments, Underlay Network 120 may comprise an IP transport network. Underlay Network 120 provides layer L2 to L3 connectivity between Switch 111, Switch 112 and Switch 113. Underlay Network 120 may transport VXLAN segments VNID102 and VNID103 to Switch 112 comprising Terminating VTEP 106. Terminating VTEP 106 includes a Decapsulation Module that converts VXLAN segments VNID102 and VNID103 to VLAN segments VLAN12 and VLAN13. In turn, VLAN segment VLAN13 may be coupled to Host4 and Host5. VLAN segment VLAN12 may be coupled to Host6.

Similarly, Underlay Network 120 may transport VXLAN segments VNID101 and VNID102 to Switch 113 comprising Terminating VTEP 108. Terminating VTEP 108 includes a Decapsulation Module that converts VXLAN segments VNID101 and VNID102 to VLAN segments VLAN12 and VLAN13. In turn, VLAN segment VLAN12 may be coupled to Host? and Host8. VLAN segment VLAN11 may be coupled to Host9.

In one or more embodiments, Switch 111 may comprise an originating application. Switch 112 may comprise terminating application2 and Switch 113 may comprise terminating application2. One skilled in the art will recognize that Originating VTEP 104 may also be a "terminating VTEP" with a decapsulation module, and Terminating VTEP 106 and 108 may also be an "originating VTEP" with an encapsulation module.

Figure 2:
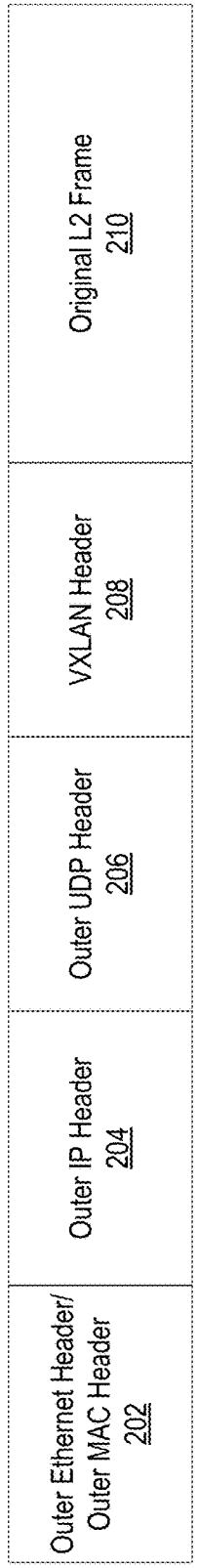
FIG. 2 depicts a VXLAN frame format, according to embodiments of the present disclosure.

FIG. 2 depicts a VXLAN frame format 200, according to embodiments of the present disclosure. VXLAN frame format 200 comprises Outer Ethernet Header/Outer MAC Header 202, Outer IP Header 204, Outer UDP Header 206, VXLAN Header 208, and Original L2 Frame 210.

In one or more embodiments, VXLAN packets may be encapsulated over a UDP packet through the use of MAC Address-in-User Datagram Protocol (MAC-in-UDP) and tunneled across different data centers using virtual end point tunnels. In other words, VXLAN defines a MAC-in-UDP encapsulation format where the original Layer 2 frame from the source VM has a VXLAN header added and is then encapsulated again in a UDP-IP packet. FIG. 2 shows a VXLAN Frame format and the related encapsulations over the original Layer 2 frame. Notice how each header is used by the different components as the packet traverses from source to destination.

As previously discussed, frame encapsulation is done by an entity known as a VXLAN Tunnel Endpoint (VTEP.) A VTEP has two logical interfaces: an uplink and a downlink. The uplink is responsible for receiving VXLAN frames and acts as a tunnel endpoint with an IP address used for routing VXLAN encapsulated frames. These IP addresses are infrastructure addresses and are separate from the tenant IP addressing for the nodes using the VXLAN fabric.

In one or more embodiments, VXLAN frames are sent from IP of the VTEP sending the frame, to IP address assigned to the destination VTEP. Packets received on the uplink are mapped from the VXLAN ID to a VLAN and the Ethernet frame payload is sent as an 802.1Q Ethernet frame on the downlink. During this process a MAC header and VXLAN ID may be determined in a local table. Packets received on the downlink are mapped to a VXLAN ID using the VLAN of the frame. A lookup is then performed within the VTEP L2 table using the VXLAN ID and destination MAC; this lookup provides the IP address of the destination VTEP. The frame is then encapsulated and sent out the uplink interface.

E. VXLAN Configuration

In one or more embodiments, a static VXLAN configuration may be implemented in the following steps:
1) Create a static VXLAN instance
2) Create a VNI profile
3) Associate a VNID to the VNI profile
4) Associate a remote VTEP to the VNID by attaching a VNID profile.
5) Associate the VNID to a VLAN An example VXLAN configuration may be presented as follows:
vxlan-instance 1 static
  local-vtep-ip 55.55.55.55
  no shutdown
  vni-profile 100
    vnid 100,200
  remote-vtep-ip 66.66.66.66 vni-profile 100
  remote-vtep-ip 88.88.88.88 vni-profile 100

In the aforementioned example, the VTEP IP address is 55.55.55.55, the VNI profile is 100, the VNID segments are VNID 100 and VNID 200, and the remote VTEP IP addresses are 66.66.66.66 and 88.88.88.88, each with a VNI profile of 100.

In one or more embodiments, this configuration may be repeated for each of the remote VTEPs which in scaled environments could be a challenge for provisioning. With "n" remote VTEPs having different sets of "m" unique VXLAN segments hosted then the number of configurations required will be n×m.

F. Auto Discovery of VTEPs in Static VXLAN Deployments

In one or more embodiments, static VXLAN deployments have the pain point of manually configuring all the remote VTEPs and their associated VXLAN VNID segments in the network. Without this manual configuration, VTEP may not learn the presence of remote VTEPs and their associated host VMs or create the flood-list to send BUM traffic to all the hosts in a virtual network (VN) segment. An objective is to provide a mechanism by which all VTEPs and their associated VNs are auto-discovered in static VXLAN deployments.

In some embodiments, the aforementioned auto-discovery objective can be achieved by combining the multicast for VXLAN deployments for handling BUM traffic with the BSR capability to auto identify the VTEP endpoints and their associated VXLAN segments. VXLAN standard specifies multicast as one of the ways to send BUM traffic to the relevant VTEPs (by mapping VNIDs to multicast groups). Every network can have multiple BSR routers configured and one may be elected as primary BSR and another one as Standby BSR.

One may identify BUM traffic in VXLAN underlays by constructing a multicast tree for each VN segment designated by a specified multicast group address. The method may provide auto-discover of remote VTEPs and their associated VNIDs using PIM BSR. The multicast capability can enable PIM BSR functionality to elect a dynamic RP for the multicast network. As per BSR standard procedure, this method may be implemented with following principles:
  1) The PIM BSR mechanism typically exchanges each device configured candidate RP-address to their multicast group mappings to a Primary BSR.
  2) The Primary BSR floods the consolidated list of all the candidate-RPs to the respective multicast group address to all devices in the network.
  3) The switches then run the same hash algorithm to derive a single common RP for a given group or group ranges.

In one or more embodiments, the information provided in BSR messages may be mapped as follows:
  1) Each multicast group address in the BSR message remaps to locally configured VXLAN VNID which is common across all VTEPs.
  2) The candidate-RP address in the BSR message corresponds to the remote VTEP-IP addresses.

This method may determine VTEP information and its associated VXLAN segments that are configured. This data may be input into a VXLAN module for auto-configuration.

In one or more embodiments, a method for auto discovery for of VTEPs in static VXLANs may include:

PIM-based BSR and candidate-RP advertisements can be advertised to all the VTEP elements in the network.

Candidate RP IP addresses can be mandated to be the VTEP IP.

Administrator can map each VNID to a multicast group and this mapping should be consistent or common across all the VTEPs.

All nodes configured with candidate-RP advertisements (i.e., every VTEP), can send their information of RP to group mapping to the Primary BSR.

The Primary BSR (or elected BSR) can consolidate the candidate-RP to group mappings and propagates it through PIM Messages which is received by all the PIM routers in the network.

Every VTEP can have the set of all remote VTEPs and the corresponding VNID associations (reverse mapped from the Group ID obtained from the PIM BSR exchanges).

A remote VTEP list and the corresponding VNI profile is fed to the VXLAN application, circumventing the need for manually provisioning the remote VTEP list and associated VNIDs, in a static VXLAN deployment.

Figure 3:
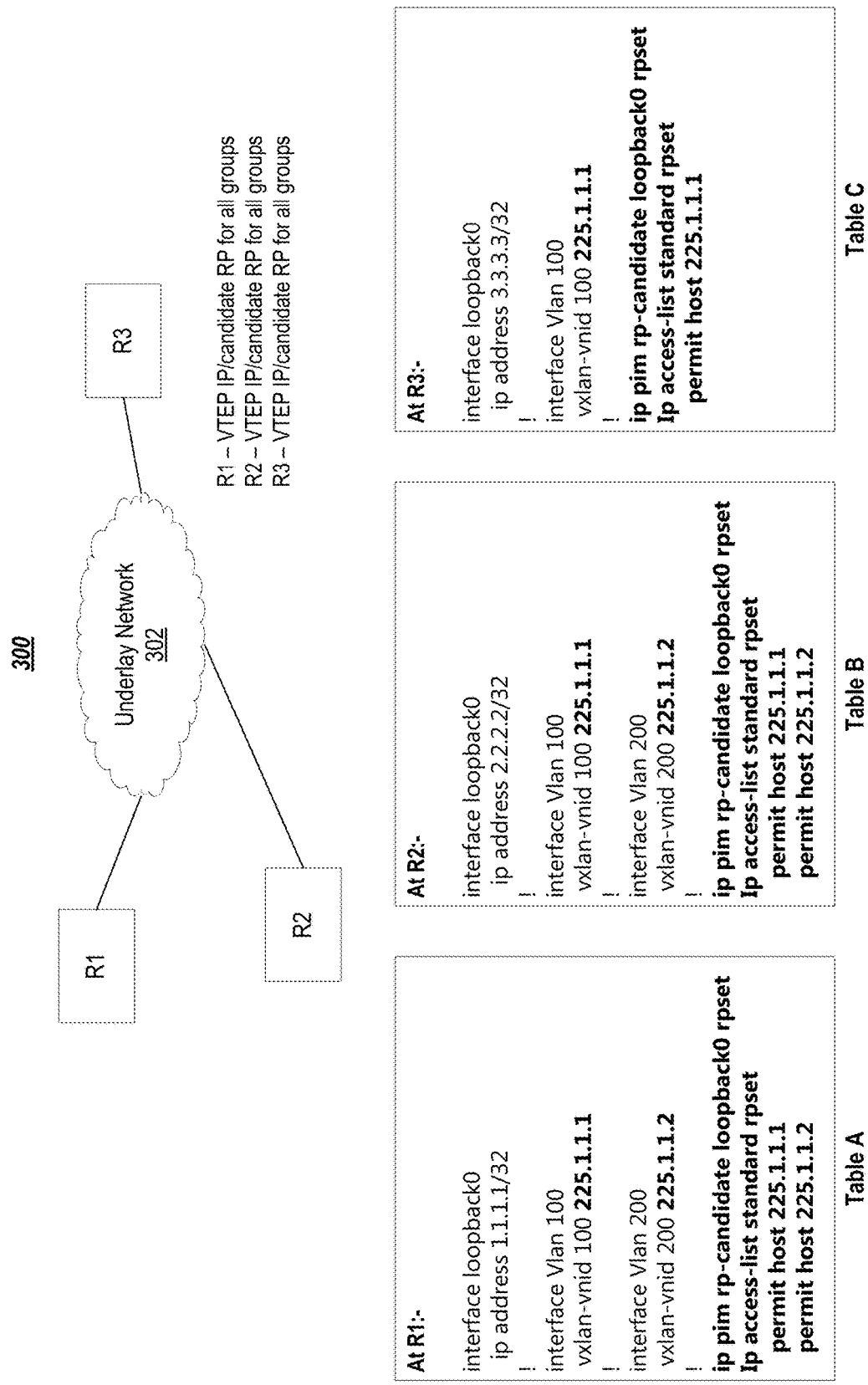
FIG. 3 depicts a VXLAN configuration at multiple nodes including VTEP IP/candidate rendezvous point (RP) for all nodes, according to embodiments of the present disclosure.

FIG. 3 depict a VXLAN configuration at multiple nodes 300 including VTEP IP/candidate rendezvous point (RP) for all nodes, according to embodiments of the present disclosure. As illustrated, the network comprises nodes R1, R2 and R3, coupled together via underlay 302. In FIG. 3, "groups" refers to multicast group addresses. In one or more embodiments, an objective may be to obtain a database from the BSR and derive an auto mapping for VXLAN remote-VTEP-IP to VNID. Hence, it may not matter which node becomes the RP for a given multi-cast group address. PIM protocol operations apply irrespective of whichever node is elected as RP.

For node R1, the candidate-RP and multicast group information is indicated in Table A. Specifically, for node R1, the IP address is 1.1.1.1/32. Node R1 supports VLAN interfaces VLAN 100 and VLAN 200. VLAN 100 is associated with VXLAN segment, vxlan-vnid 100, which is associated with multicast group address 225.1.1.1. Similarly, VLAN 200 is associated with VXLAN segment, vxlan-vnid 200, which is associated with multicast group address 225.1.1.2. The code at the bottom of Table A is as follows:

ip pim rp-candidate loopback0 rpset
ip access-list standard rpset
   permit host 225.1.1.1
   permit host 225.1.1.2

This code specifies that R1 agrees to be a candidate-RP supporting multicast group IP 225.1.1.1 and 225.1.1.2. At this point, R1 does not know what other VNID segments exist in the multicast network. To create a tunnel, R1 needs to know the end points, i.e., VTEPs.

For node R2, the candidate-RP and multicast group information is indicated in Table B. Specifically, for node R2, the IP address is 2.2.2.2/32. Node R2 also supports VLAN 100 and VLAN 200, which are associated with vxlan-vnid 100 and vxlan-vnid 200, respectively. At node R3, the IP address is 3.3.3.3/32. Similar to R1, R2 agrees to be a candidate-RP supporting multicast group IP 225.1.1.1 and 225.1.1.2. And at this point, R2 does not know what other VNID segments exist in the multicast network. The code at the bottom of Table B specifies that R2 agrees to be a candidate-RP supporting multicast group IP 225.1.1.1 and 225.1.1.2.

For node R3, the candidate-RP and multicast group information is indicated in Table C. Specifically, node R3 supports VLAN interface VLAN 100. After VTEP encapsulation, VLAN 100 is associated with VXLAN segment, vxlan-vnid 100, which is associated with multicast group address 225.1.1.1. R3 agrees to be a candidate-RP supporting multicast group IP 225.1.1.1. And at this point, R3 does not know what other VNID segments exist in the multicast network. The code at the bottom of Table C specifies that R3 agrees to be a candidate-RP supporting multicast group IP 225.1.1.1. The codes at the bottom of Tables A, B and C are the basis for Table 1 of FIGS. 4A, 4B and 4C, as will be subsequently discussed herein.

Figure 4A:
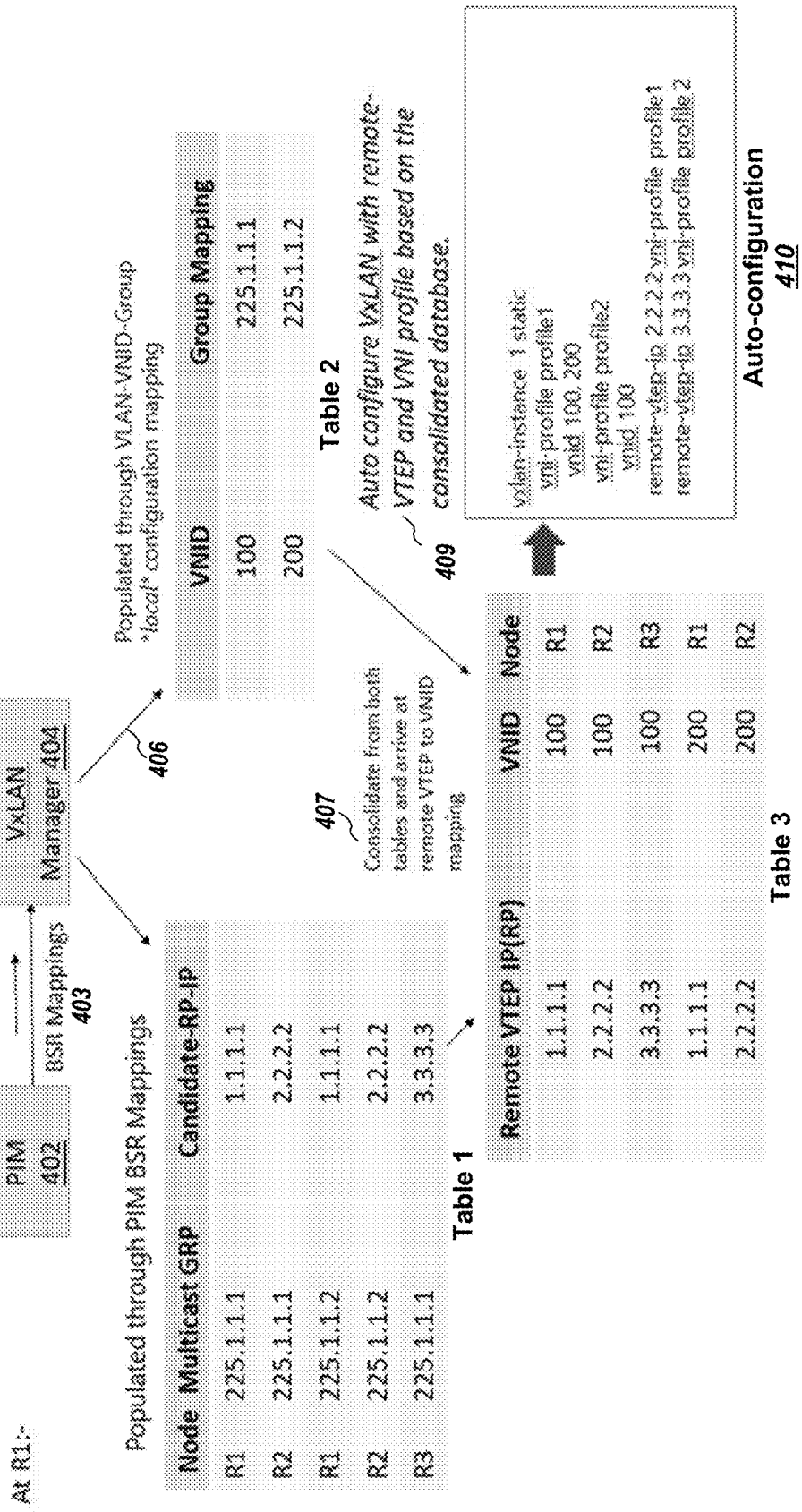
FIGS. 4A, 4B and 4C depict mapping for auto-discovery of VXLAN tunnel endpoints (VTEPs) relative to VXLAN network identifier (VNID) using protocol-independent multicast (PIM) bootstrap router (BSR), according to embodiments of the present disclosure.
Figure 4B:
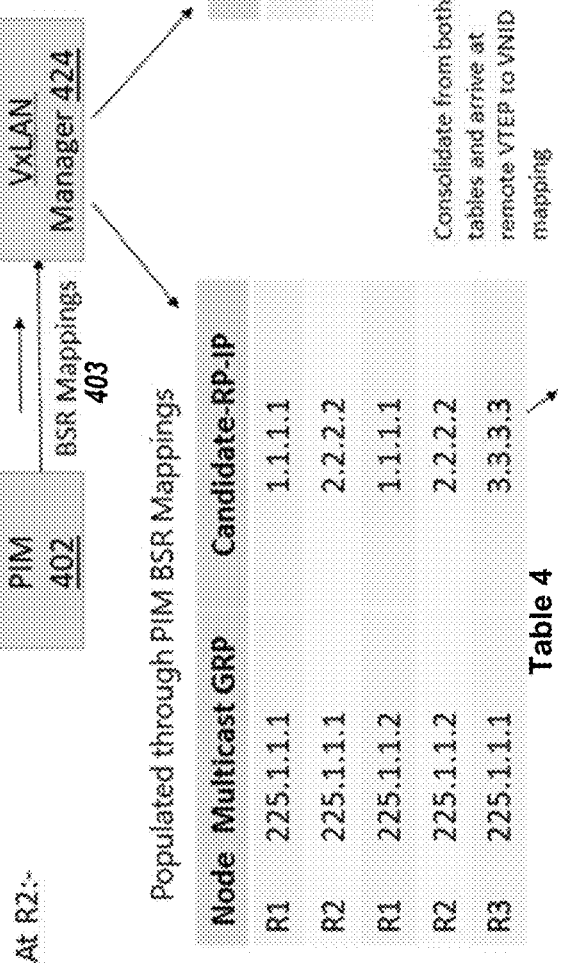
Figure 4C:
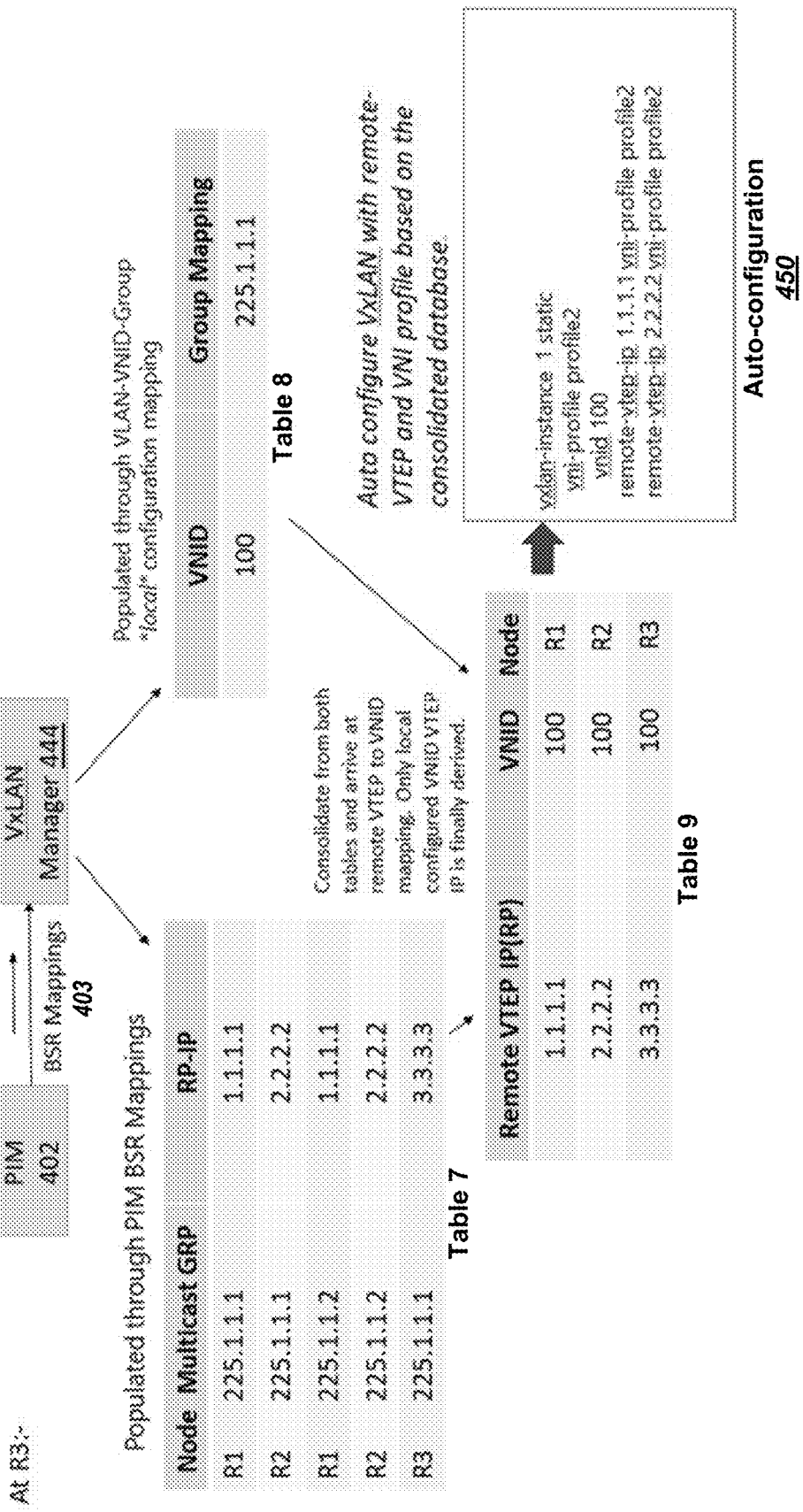

FIGS. 4A, 4B and 4C depict an example auto-discovery of VXLAN tunnel endpoints (VTEPs) relative to VXLAN network identifier (VNID) using protocol-independent multicast (PIM) bootstrap router (BSR) of a network system as depicted in FIG. 3, according to embodiments of the present disclosure. In one or more embodiments, FIG. 4A depicts a methodology for auto-discovery of VTEPs 400 in static VxLAN deployment at node R1. In one or more embodiments, via PIM messaging, all nodes configured with candidate-RP advertisements (in the depicted example in FIG. 3, every VTEP), have sent their information of RP-to-group mapping to the elected BSR, which is represented by PIM 402. In other words, in one or more embodiments, PIM 402 indicates PIM protocol has received a consolidated list of all candidate-RPs-to-multicast-group mappings from Elected-BSR and this database is fed to a software component, which derives the VXLAN VTEP and VNID information. In one or more embodiments, one of R1, R2, or R3 may be selected as the elected BSR; alternately, another information handling system (not depicted in FIG. 3) may by the elected BSR. The elected BSR consolidates the candidate-RP-to-group mappings and propagates this information through PIM messages which is received by all the PIM routers in the network, including R1. As depicted, the BSR mappings 403 represent the candidate-RP-to-multicast group information in the multicast network, including nodes R1, or R2 or R3.

At node R1, a VXLAN Manager 404 receives the BSR mapping 403. BSR mapping 403 comprises VXLAN virtual network ID (VNID) information and multicast-group-to-candidate-RP-IP information in the multicast network. The candidate-RP-IP address is used as the VTEP IP. An administrated has mapped each VNID to a multicast group which can be consistent across all VTEPs in the multicast network. In one or more embodiments, VXLAN Manager 404 is located at node R1. In one or more embodiments, VXLAN Manager 404 is a software component that is present in the VTEPs. The VXLAN Manager 404 receives the BSR mapping 403; effectively, BSR mapping 403 from PIM 402 is Table 1.

Table 1 of FIG. 4A illustrates multicast-group-to-candidate-RP-IP mapping, which was populated based upon BSR mapping 403. Note that in the depicted example, each line of Table 1 is associated with a node in the network. For example, from node R1, Multicast Group 225.1.1.1 is mapped to Candidate-RP-IP 1.1.1.1.

In one or more embodiments, VXLAN Manager 404 also generates mapping data 406 representing a local configuration mapping for its VNIDs and Multicast Group IDs, as illustrated in Table 2. As illustrated, VNID 100 is mapped to Multicast Group 225.1.1.1. This mapping is consistent with the multicast group information in Table A of FIG. 3.

Given the network data in Table 1 and the local configuration in Table 2, in one or more embodiments, node R1 may consolidate (407) information using both tables to generate a consolidated mapping of remote VTEP IP (RP)-to-VNID mapping, as represented in Table 3. In the depicted example of FIG. 4A, each line of Table 3 is associated with a particular node. Now, node R1 knows that VTEP IP (RP) 2.2.2.2 (node R2) is associated with VNID 100 and VNID 200 and that VTEP IP (RP) 3.3.3.3 (node R3) is associated with VNID 100. Previously, this information was unknown to node R1. In one or more embodiments, node R1 may skip itself from Table 3 to arrive at auto-configuration 410.

Given this auto-discovered mapping of Table 3, node R1 may auto-configure (409) its VXLAN with remote VTEPs and VNI profiles. The sample auto-generated configuration commands are depicted in auto-configuration 410 in FIG. 4A. As illustrated in auto-configuration 410:

1) Vxlan 1 is operating in a static mode.
2) vni profile 1 is associated with vnid segments 100 and 200
3) vni profile 2 is associated with vnid segment 100
4) remote vtep-ip 2.2.2.2 is associated with vni profile 1
5) remote vtep-ip 3.3.3.3 is associated with vni profile 2

Thus, node R1 now knows what other VNID segments exist in the multicast network and their IP address and be auto-configured with this information.

In like manner as described with respect to node R1 in FIG. 4A, FIGS. 4B and 4C similarly depict the auto-discovery of VTEPs 420 and 440 in the static VXLAN deployment of FIG. 3 and auto-configuration processes for nodes R2 and R3, respectively. FIG. 4B includes Table 4 (which, in embodiments, is that same table as Table 1), Table 5, Table 6 and auto-configuration 430. FIG. 4C includes Table 7 (which, in embodiments, is that same table as Table 1), Table 8, Table 9 and auto-configuration 450. Note that for node R2, since it was configured with VLAN 100 and VLAN 200 its nearly identical to node R1, except of course that its configuration is node R2-centric rather than node R1-centric as illustrated in auto-configuration commands 430.

In the depicted embodiment, note that for node R3, since it was configured with just VLAN 100, its local configuration table mapping (Table 8) does not have an entry for VNID 200, and its Remote VTEP IP (RP)-to-VNID table (Table 9) is similarly missing entries for VNID 200 as that is not a VNID segments that is supported by node R3. Similar to the other nodes, auto-configuration (Auto-configuration 430) may be generated for node R3. As illustrated, the auto-configuration indicates:

1) Vxlan 1 is operating in a static mode.
2) vni-profile profile2 is associated with vnid 100.
3) remote-vtep-ip 1.1.1.1 is associated with vni profile2
4) remote-vtep-ip 2.2.2.2 is associated with vni-profile profile2

Thus, node R3 now knows what other VNID segments exist in the multicast network and their IP address.

Figure 5:
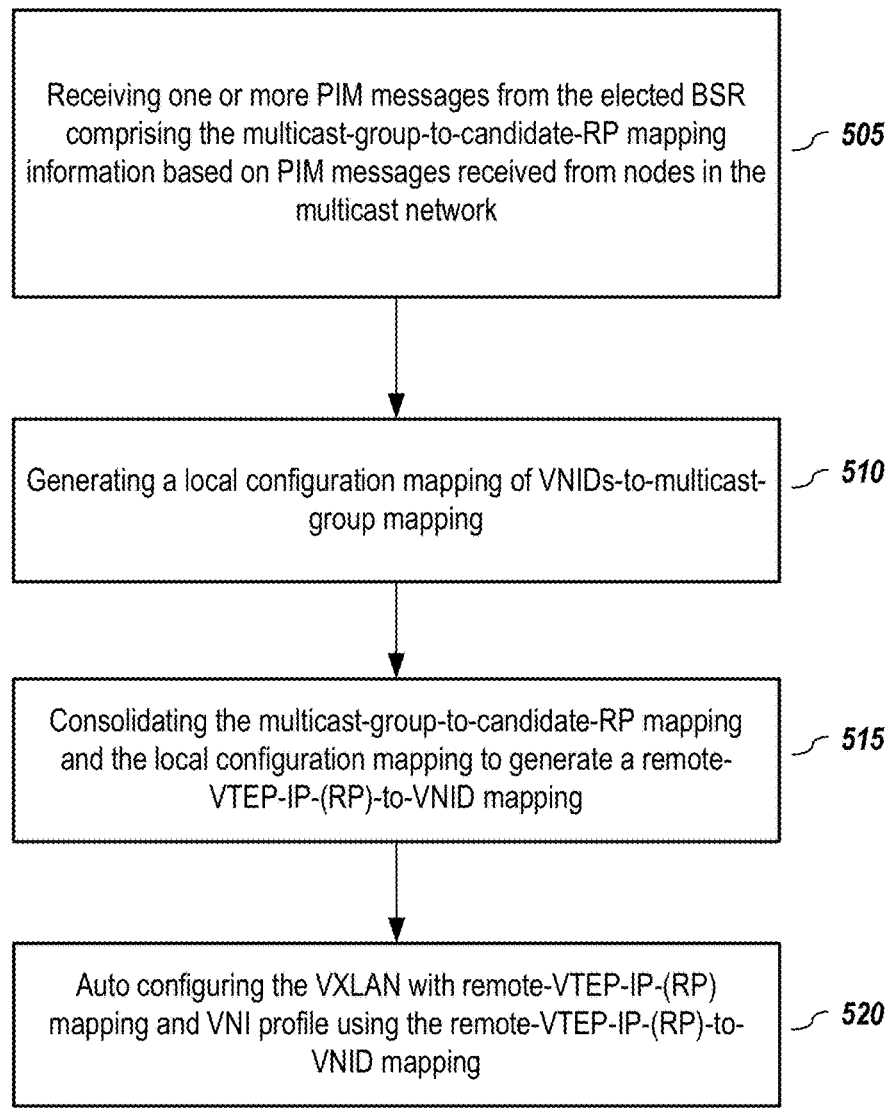
FIG. 5 depict an exemplary flow diagram of a method for auto-discovery of VXLAN tunnel endpoints (VTEPs) using protocol-independent multicast (PIM) bootstrap router (BSR) according to embodiments of the present disclosure.

FIG. 5 depict an exemplary flow diagrams 500 of a method for auto-discovery of VXLAN tunnel endpoints (VTEPs) using protocol-independent Multicast (PIM) bootstrap router (BSR) in a multicast network according to embodiments of the present disclosure. In one or more embodiments, the method may comprise the steps of:

Receiving (step 505) messages, PIM 402, from an elected BSR, in which the messages comprise information for multicast-group-to-candidate-RP mapping, for example, for R1, Table 1. The elected BSR generates the BSR mappings based on PIM messages received from nodes in the multicast network. In one or more embodiments, the elected BSR generates the BSR mappings based on PIM messages received from any combination of nodes in the multicast network.

Generating (step 510) a local configuration mapping of VNID-to-multicast-group mapping (for example, for R1, Table 2).

Consolidating (step 515) the multicast-group-to-candidate-RP mapping (e.g., Table 1) and the local configuration mapping, (e.g., Table 2), to generate a remote-VTEP-IP-(RP)-to-VNID mapping (e.g., Table 3).

Auto-configuring (step 520) a node's VXLAN with remote-VTEP and VNI profile using the remote-VTEP-IP-(RP)-to-VNID mapping (e.g., Table 3).

In one or more embodiments, a network node for auto-discovery of Virtual Extensible LANs (VXLAN) tunnel endpoints (VTEPs) in a multicast network may comprise at least one VXLAN tunnel endpoints (VTEP) and a VXLAN manager that: (1) receives one or more PIM messages from an elected boot-strap-router (BSR) comprising the multicast-group-to-candidate-rendezvous point (RP) mapping; (2) generates a local configuration mapping of VNID-to-the-multicast-group addresses; (3) consolidates the multicast-group-to-candidate-RP mapping and the local configuration mapping to generate a remote VTEP IP (RP) to VNID mapping; and (4) auto configures the VXLAN with remote-VTEP and VNI profile based on the consolidated mapping.

G. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
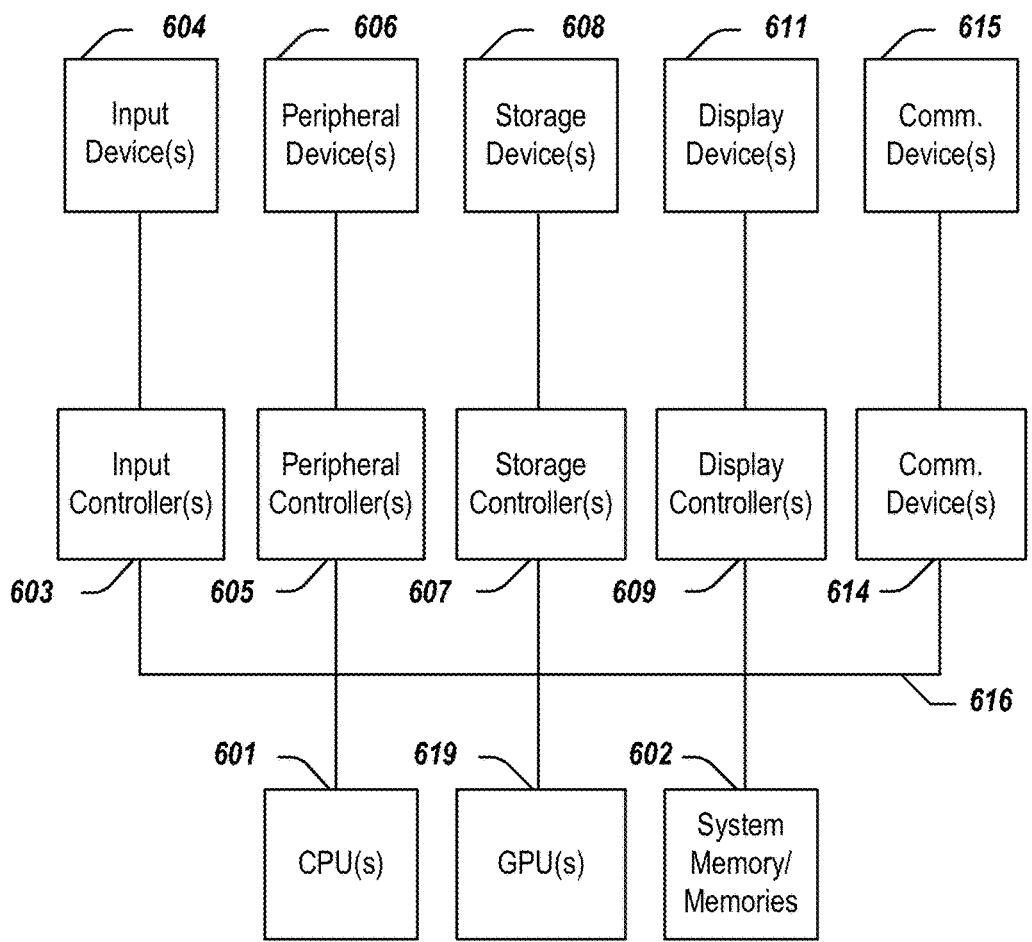
FIG. 6 depicts a simplified block diagram of an information handling system according to embodiments of the present invention.

FIG. 6 depicts a simplified block diagram of an information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 7:
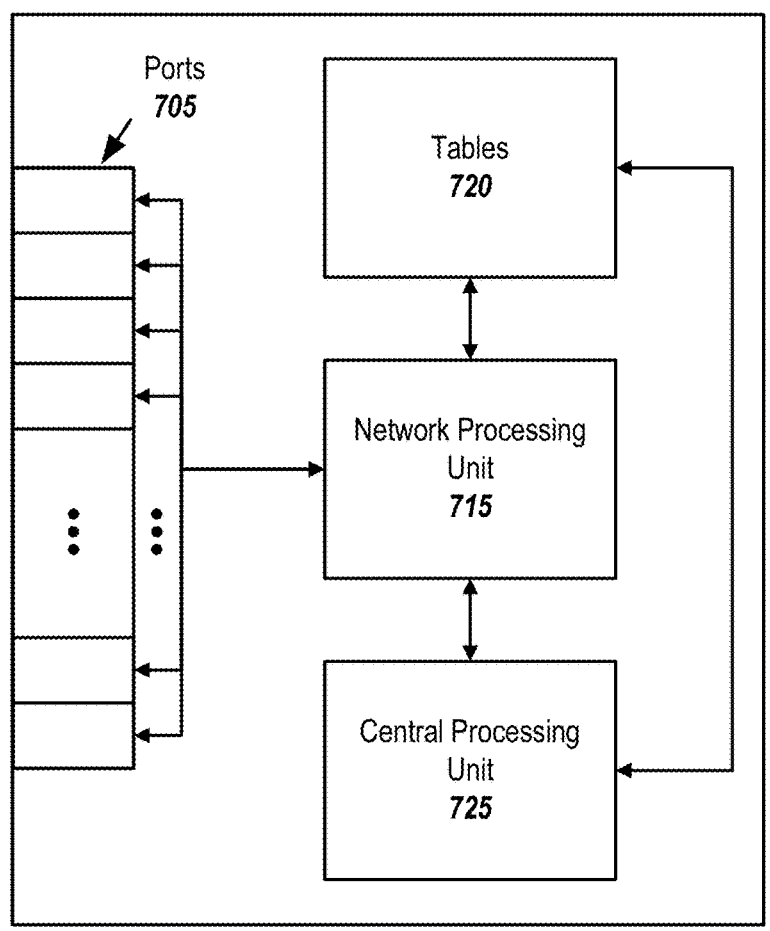
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components (including fewer or more components).

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for auto-discovery of Virtual Extensible LANs (VXLAN) tunnel endpoints (VTEPs) in a multicast network comprising:
at a router in the multicast network,
receiving PIM messages from an elected boot-strap-router (BSR) comprising a multicast-group-to-candidate-rendezvous-point (RP) mapping, wherein the elected BSR generates the multicast-group-to-candidate-RP mapping based on PIM messages received from nodes in the multicast network;
generating a local configuration mapping of VNID-to-multicast-group;
consolidating the multicast-group-to-candidate-RP mapping and the local configuration mapping to generate a remote-VTEP-IP-(RP)-to-VNID mapping; and
configuring the VXLAN with remote-VTEP-IP-(RP) mapping and VNI profile.

2. The method of claim 1, wherein the router comprises a VXLAN Manager that generates the local configuration mapping of VNID-to-multicast-group.

3. The method according to claim 1, wherein VTEPs send their RP-to-group mapping information to the elected BSR.

4. The method according to claim 1, wherein the elected BSR sends candidate-RP advertisements to VTEPs in the multicast network.

5. The method according to claim 1, wherein a mapping of each VNID-to-multicast-group is generated by a network administrator.

6. The method according to claim 5, wherein the mapping of each VNID-to-multicast-group is consistent with the VTEPs in the multicast network.

7. The method according to claim 1, wherein each router in the multicast network uses same algorithm to select a same RP address for a given multicast group.

8. The method according to claim 7, wherein the same algorithm is a hash algorithm.

9. The method according to claim 1, wherein a candidate-RP address in a PIM message corresponds to a remote VTEP-IP address.

10. The method according to claim 1, wherein each VTEP has a set of remote VTEPS and corresponding VNID associations.

11. The method of claim 1, wherein the VXLAN with remote-VTEP-IP-(RP) mapping and VNI profile is automatically configured.

12. A non-transitory computer readable medium having executable instructions operable to cause a router in a VXLAN to:
receive PIM messages from an elected boot-strap-router (BSR) comprising a multicast-group-to-candidate-rendezvous-point (RP) mapping, wherein the elected BSR generates the multicast-group-to-candidate-RP mapping based on PIM messages received from nodes in a multicast network;
generate a local configuration mapping of VNID-to-multicast-group;
consolidate the multicast-group-to-candidate-RP mapping and the local configuration mapping to generate a remote-VTEP-IP-(RP)-to-VNID mapping; and
configure the VXLAN with remote-VTEP-IP-(RP) mapping and VNI profile.

13. The non-transitory computer readable medium of claim 12, wherein routers in the multicast network that are configured with candidate-RP advertisements send their information of candidate-RP to multicast group information to the elected BSR.

14. The non-transitory computer readable medium of claim 12, wherein each VTEP has a set of remote VTEPS and corresponding VNID associations.

15. The non-transitory computer readable medium according to claim 12, wherein an IP address for a candidate-RP is the IP address of a VTEP.

16. The non-transitory computer readable medium according to claim 12, wherein PIM-based BSRs send candidate-RP advertisements to VTEP elements in the multicast network.

17. The non-transitory computer readable medium according to claim 12, wherein a mapping of each VNID to a multicast group is generated by a network administrator.

18. The non-transitory computer readable medium according to claim 17, wherein the mapping of each VNID-to-multicast-group is consistent with the VTEPs in the multicast network.

19. The non-transitory computer readable medium according to claim 12, wherein each router in the multicast network uses same algorithm to select a same RP address for a given multicast group, wherein the same algorithm is a hash algorithm.

20. A network node for auto-discovery of Virtual Extensible LANs (VXLAN) tunnel endpoints (VTEPs) in a multicast network comprising:
one or more VXLAN tunnel endpoints (VTEPs);
a VXLAN manager that:
receives a PIM messages from an elected boot-strap-router (BSR) comprising the multicast-group-to-candidate-rendezvous point (RP) mapping;
generates a local configuration mapping of VNID-to-the-multicast-group addresses;
a node boot strap router that:
consolidates the multicast-group-to-candidate-RP mapping and the local configuration mapping to generate a remote VTEP IP (RP) to VNID mapping; and
configures the VXLAN with remote-VTEP and VNI profile based on the consolidated mapping.

* * * * *